United States Patent

Watson

[15] 3,699,459
[45] Oct. 17, 1972

[54] CIRCUIT FOR SAMPLING HIGH SPEED DATA

[72] Inventor: George A. Watson, Tustin, Calif.

[73] Assignee: North American Rockwell Corporation

[22] Filed: Sept. 25, 1969

[21] Appl. No.: 861,115

[52] U.S. Cl. .................. 328/151, 324/186, 328/129, 343/13 R
[51] Int. Cl. ............................................. G01r 29/02
[58] Field of Search ...... 328/151, 129, 130; 307/269, 307/232; 324/68 C, 186; 343/7.3, 13 R

[56] References Cited

UNITED STATES PATENTS

| 3,211,924 | 10/1965 | Beck | 328/151 X |
| 3,364,466 | 1/1968 | Stine | 328/151 X |
| 3,412,331 | 11/1968 | Boatwright et al. | 328/151 X |
| 3,469,112 | 9/1969 | Hands et al. | 328/151 X |
| 3,534,271 | 10/1970 | Loewer | 328/130 X |
| 3,553,582 | 1/1971 | Gouillou | 324/186 |

Primary Examiner—Stanley T. Krawczewicz
Attorney—L. Lee Humphries, H. Fredrick Hamann and Robert G. Rogers

[57] ABSTRACT

The invention is a data divider for sampling high speed data received from master and slave transmitters in a long-range navigational system for generating slower speed data which can be processed by a relatively lower speed system to determine the location of the receiver. The system also generates clock signals for the low speed system. The data is synchronized with the clock signals.

4 Claims, 9 Drawing Figures

INVENTOR.
GEORGE A. WATSON
BY Robert D. Rogers
ATTORNEY

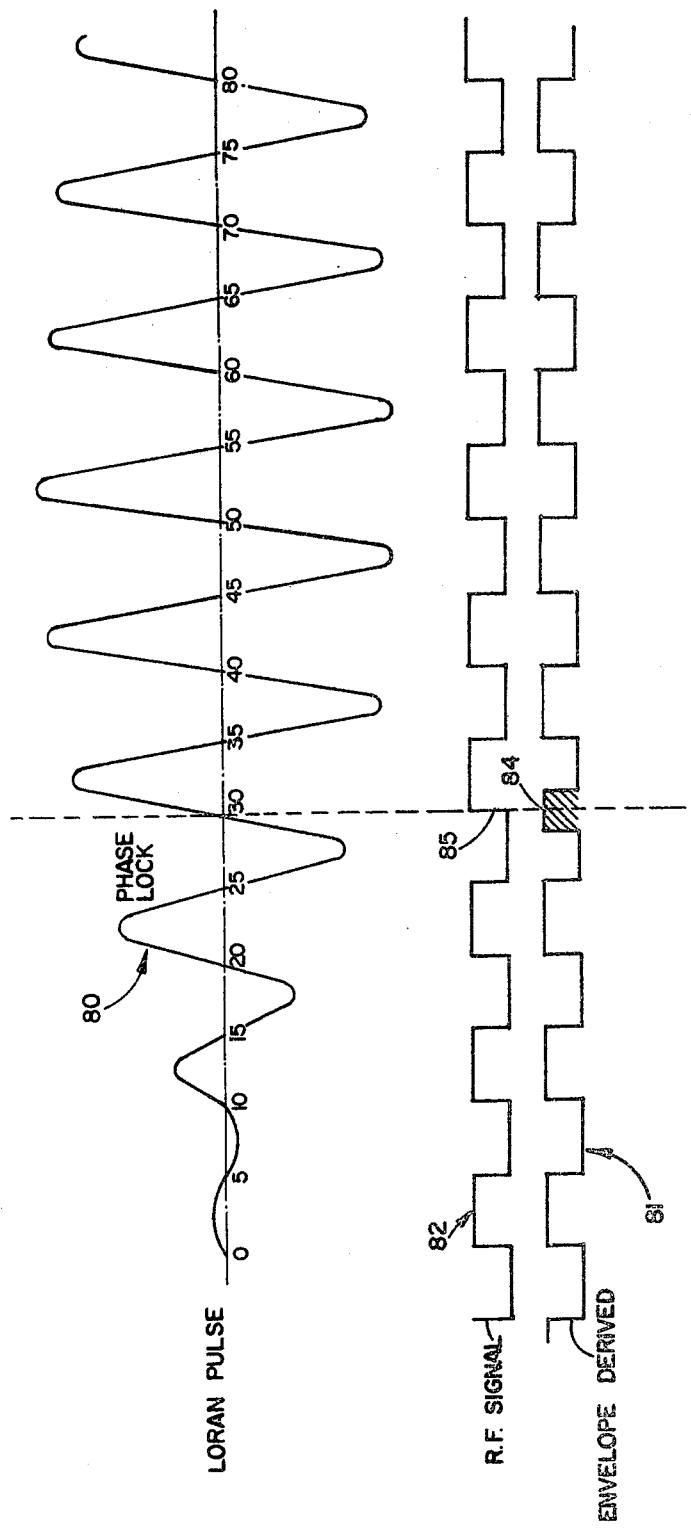

CIRCUIT FOR SAMPLING HIGH SPEED DATA

BACKGROUND OF THE INVENTION

1. Field of the Invention

The invention relates to a circuit for dividing high frequency data into relatively slower frequency data samples.

2. Description of Prior Art

Master and slave stations, as part of a long-range navigational (LORAN) system, transmit radio frequency (RF) pulse groups at precisely determined and regularly spaced intervals in time. The pulse groups are coded in a particular manner for recognition by the receiver. The receiver samples the pulse groups at precisely determined intervals in time in order to measure the time difference between pulse groups from the different transmitters. The measure of the difference between the pulse groups provides an accurate determination of the location of the receiver.

LORAN receivers are currently implemented with high speed bipolar integrated logic circuits because the time of arrival of the pulse groups must be determined to a relatively high degree of accuracy. The pulses are actually being measured infrequently since the separation between the pulses is large relative to the resolution of the system. Therefore, it should be obvious that although high speed sampling logic is required, the logic used in determining when to sample the incoming high speed data may be implemented with relatively lower speed circuits. Typically, relatively low speed complex MOS integrated circuits can be used to implement the data processing portion of a LORAN receiver system.

The sampling of high speed data refers to the taking or extracting data samples very accurately in time using circuits which have a fast response time. The generation of slow speed data refers to data samples which are extracted from the high speed data and which are synchronized with a processing system using a relatively low frequency clock.

It would be preferred to provide a LORAN receiver or any data sampling system in which the amount of high speed logic is minimized so that a substantial portion of the system can be implemented with economical, relatively low power circuitry, such as MOS integrated circuits. The present invention provides such a receiver.

SUMMARY OF THE INVENTION

Briefly, the invention comprises a system for sampling high frequency data received from a plurality of transmitters so that relatively lower frequency data can be produced and used to locate the position of a receiver in a navigational system embodiment. The slower frequency data can also be used in other embodiments.

A second phase related data pulse may be generated, or derived, from each received data pulse for comparison purposes. The phase relationship is controlled so that a distinct phase reversal occurs at a predetermined time within the derived data pulse. In other embodiments, other means may be used for comparison purposes.

The contents of a register is continuously changed so that the time at which the data samples are taken changes from pulse to pulse. Eventually, the sampling time becomes coincident with the predetermined time within the pulse. Thereafter, time differences between consecutive pulses can be calculated.

The register is controlled by a relatively slower frequency processor which monitors the data samples to determine if the samples have been taken at the pre-established time. Usually, the pre-established time is related to the edge of a specific pulse. The same process occurs for each pulse from each transmitter.

Since the data samples have a substantially slower rate than the received data pulses, a relatively slower speed logic system can be used to calculate the time difference between the data samples taken at a pre-established time within a pulse for accurately determining the position of the receiver. The time between the pulses is a function of the position of the receiver with a coordinate system.

Multiphase clock signals are generated simultaneously with the generation of the data samples. The data samples are synchronized with the clock signals. The slower speed processing logic system operates at the frequency rate of the synchronized clock signals.

Therefore, it is an object of this invention to provide a high speed data sampling system for generating relatively slower speed data to a data processing system.

It is another object of the invention to provide a bipolar data divider which samples high speed data to produce relatively slower speed data used by a data processor in determining the time interval between selected data samples.

A still further object of the invention is to provide a system for eliminating the necessity for high speed data processing systems used in a navigational system by providing a high speed data sampling system which generates relatively slower speed data to a relatively slow speed data processing system.

Another object of the invention is to provide an improved data sampling system used in determining the location of a receiver as a function of the time interval between selected data samples.

Still a further object of the invention is to provide a high speed data sampling system in which data samples are generated in synchronism with multiphase clock signals so that the data samples can be processed in synchronism and at the rate of the multiphase clock signals in order to generate navigational data.

It is a still further object of the invention to provide a system in which the selection of the time for taking data samples from high speed data pulses is controlled as a function of the selection time of previously taken data samples relative to a pre-established reference position.

A further object of the invention is to provide a system in which incoming high speed data pulses are used to generate phase related pulses for establishing a reference position used in determining the interval between successive data pulses.

A further object of this invention is to provide a system for changing the selection of data samples for high speed data generated by a plurality of transmitters until the sample is taken at a predetermined time so that the location of the receiver can be calculated by determining the distance between data samples taken at the predetermined time in successive data pulses.

These and other objects of the invention will become more apparent when taken in connection with the drawings, a brief description of which follows:

BRIEF DESCRIPTION OF DRAWINGS

FIG. 3 is an illustration of a portion of a pulse group and binary signals produced from the pulse group.

DESCRIPTION OF THE PREFERRED EMBODIMENT

Figure 1:
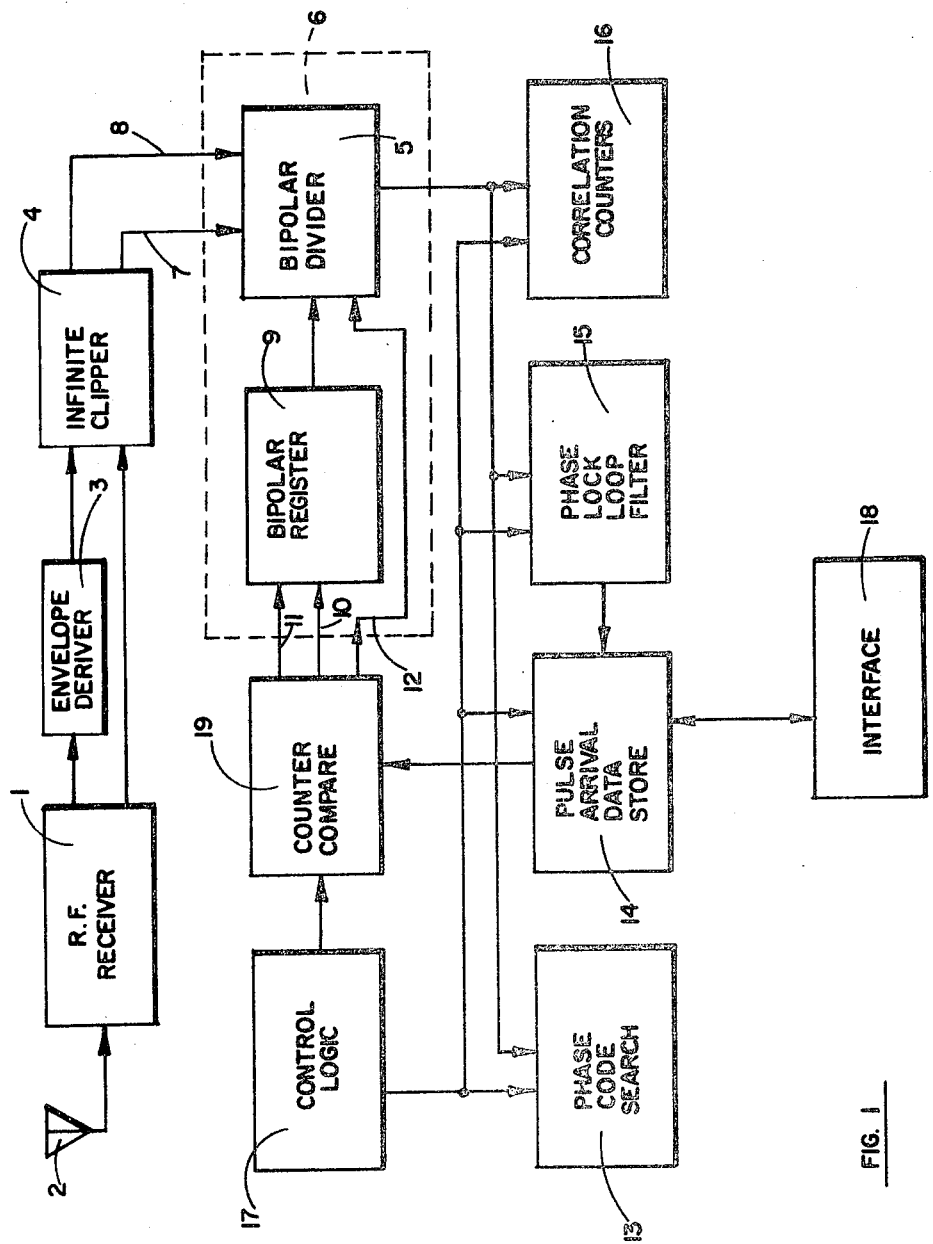
FIG. 1 is a block diagram of a receiver for the long-range navigational system using the data sampling circuit described herein.
Figure 2:
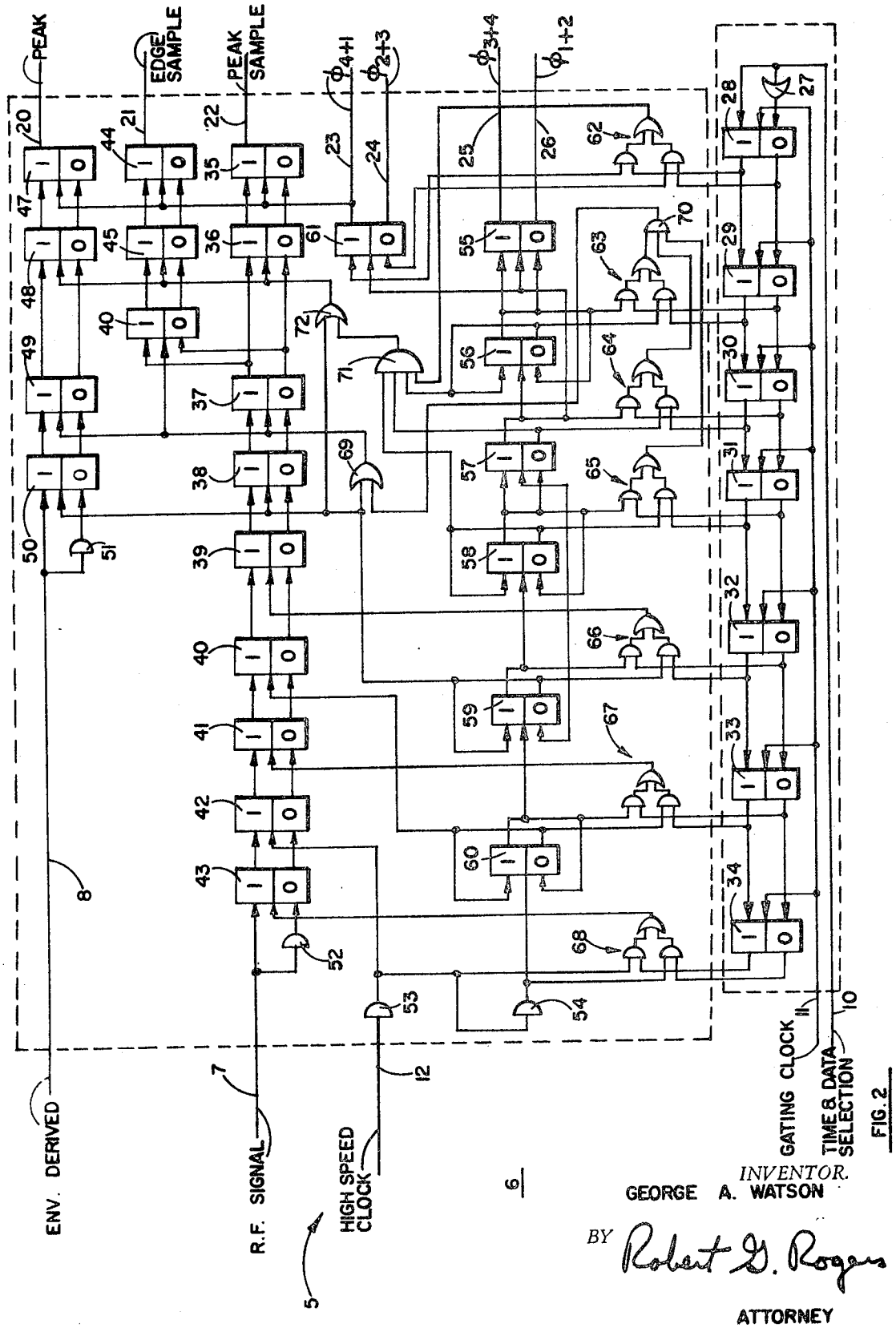
FIG. 2 is a schematic illustration of the data sampling circuit.

FIG. 1 is a block diagram of a receiver for the long-range navigational system (LORAN) in which a data sampling circuit, shown in more detail in FIG. 2, may be used. It should be understood that the sampling circuit is not limited to use within a navigational system. The LORAN system was selected for purposes of describing a specific embodiment of the circuit.

FIG. 1 illustrates RF receiver 1 which receives and amplifies pulses transmitted by master and slave transmitters (not shown). In a practical system, one master transmitter and two slave transmitters may be used to transmit RF pulse groups. By determining the time difference between the pulse groups, the location of a LORAN receiver can be precisely determined. For purposes of this description, it is assumed that the pulses are separated from each other by approximately 500–1,000 microseconds and that the pulses comprise 100 KHZ RF pulse groups. The pulse groups are received by antenna 2 shown at the front end of receiver 1.

An envelope derived signal (see FIG. 3) is produced from each received pulse group, or signal, by envelope deriver 3. Signal 80 in FIG. 3 is an illustration of a RF pulse group. The envelope derived signal is used by the system for comparison purposes as described in more detail subsequently. In effect, the incoming signal 80 is delayed by a certain phase time and amplified so that at a certain time within a pulse group, a phase reversal occurs relative to the received pulse group. The point at which the phase reversal is used in measuring time difference between adjacent pulse groups is described subsequently.

Both signals are received by infinite clipper 4 which infinitely clips both signals to produce the binary signals 81 and 82 shown in FIG. 3. It is pointed out that the system shown in FIG. 1 could process analog signals. Binary signals are used in the preferred embodiment.

Bipolar divider 5 of sampling circuit 6 receives both binary signals on lines 7 and 8. Bipolar register 9, also of circuit 6, receives a computed binary number on line 10. The number represents the time at which a sample is to be taken within a logic clock signal of the system which approximately coincides with the signal on line 7. A clock signal on line 11 gates the information into the register.

A relatively high speed clock signal is received by the divider 5 on line 12 for gating purposes. The high speed clock signal may have a frequency of 12.8 MHZ, which is consistent with the other frequency examples given above.

The bipolar divider 5 is implemented with high speed logic (see FIG. 2) which continuously generates three sets of data samples corresponding to the edge and peak of the signal on line 7 and to the peak of the envelope derived signal on line 8. The sample from the signal on line 8 is used for comparison purposes to "lock in" at a particular phase at the signal on line 7. The spacing of the individual samples and the sampling accuracy are determined as a function of the frequencies of the signals being sampled and the clock frequency rate.

Register 9 is continuously being filled with the time-of-arrival (line 10) number calculated by the other portions of the FIG. 1 system. As indicated above, the time-of-arrival number specifies the time within a pulse of the signal on line 7 that a specific example is to be taken. All other samples are taken with reference to the time-of-arrival number. The high frequency clock (line 12) is divided down by the divider. The data samples are synchronized with the clock signal during the dividing sequence. The lower frequency clock is used in processing the data by the slower speed MOS circuits shown in FIG. 1.

The data samples and clock signals from divider 5 are received by circuits identified functionally in FIG. 1 as phase code search circuit 13, pulse arrival data store circuit 14, phase lock loop filters 15, correlation counters 16, control logic 17, and interface circuits 18. The interface circuits 18 are used to connect the LORAN receiver with a computer (not shown).

Data produced by the LORAN receiver may be accessed by the computer and used for other purposes. Similarly, the computer can be used to place data into the LORAN receiver for controlling its operation consistent with a computer program.

In one embodiment, the interface circuits may be comprised of a 32-bit gated MOS shift register for buffer storage of transmitted data. The other circuits may also be implemented by relatively slow speed MOS circuits.

The phase code search circuit 13 is used to distinguish between particular pulse groups. Pulse groups from different transmitters are coded differently and are, therefore, distinguishable. The phase code search circuit is used to identify the pulse groups prior to identifying a particular time interval within a pulse group. The phase code search circuit implements an algorithm for identifying the pulse groups.

After the various pulse groups have been identified, the correlation counter circuits 16 are used to determine the leading interval of the pulses. That mode of operation is referred to as the "sky settle" mode. The correlation counter circuits implement a sky settle algorithm. After the leading edge of the pulse groups have been identified during the sky settle mode, the correlation counter circuits are used to identify a specific cycle inside a pulse group on which the phase lock loop filter circuit 15 can servo, or lock. More specifically, after a specific pulse edge within a cycle has been identified, that edge is tracked by the phase lock loop filters. In the usual case, the tracking edge is located within the first few cycles of a pulse.

The pulse arrival data store circuit 14 is operative during the modes described above. Time-of-arrival numbers are adjusted and stored by circuit 14 during these modes. The time-of-arrival number is provided to counter-compare circuit 19 for comparison with a free running counter which provides a relative time reference. The number is also provided as an input on line 10 to the register 9 which controls the sampling of the data about the pulse edge being tracked. Counter-compare 19 also generates the gating clock on line 11. For convenience, the clock on line 12 is also shown originating from counter-compare 19.

Control logic 17, connected to the circuits of FIG. 1 as shown, detects the completion of the various modes and controls the operations of the system. After each mode, the logic 17 directs the circuit to enter the next phase.

Inasmuch as the operating modes for a LORAN receiver and circuitry necessary to implement algorhithms for executing the modes is not a part of the present invention, specific details are not included. The general information is provided as an aid in understanding the processing of the data samples generated by the data sampling circuit 5.

The pulse arrival data store circuits 14 may be implemented by 40-bit MOS recirculating registers, which store the time-of-arrival numbers, and a 16-bit MOS register, which stores a number identifying a particular time interval in a pulse group. As indicated above, when the particular cycle has been identified, the edge of a binary pulse is tracked by the phase lock loop filter circuit 15.

By way of general information, it is pointed out that a time-of-arrival register in circuit 14 contains the anticipated time-of-arrival number of the next pulse group as measured, for example, by a free-running counter. After each master pulse interval, the length of time until the next interval is added to the time-of-arrival number in anticipation of the next pulse group. Each pulse in the pulse group is sampled and corrected for phase coding. Depending on the polarity, i.e. plus or minus, of the data sample, a correction is added to or subtracted from the time-of-arrival number. As a result, the register 9 is continuously changed as a function of the difference between the anticipated time-of-arrival number and the number represented by the actually received data sample.

FIG. 3 is an example of a portion of a RF pulse group 80, a hard-limited signal 82 and a hard-limited envelope derived signal 81, both generated from the pulse group. The phase reversal of the envelope derived signal 81 is shown at point 83. The time at which the phase reversal occurs is used to determine the proper edge for use in the phase lock loops. The phase of the signal on either side of point 83 is the same as contrasted with the phase reversal which occurs in the hard-limited signal on either side of the point 83. As a result, it should be obvious that the phase of the data samples taken from the hard-limited signal 81 can be compared with the phase of the data samples taken from signal 82 for tracking purposes.

The bipolar sampling circuit 5, shown in FIG. 2, is a high speed circuit implemented by conventional bipolar integrated circuits. J-K flip flops are used in the preferred embodiments. The data divider has five inputs, 7, 8, 10, 11 and 12, and seven outputs, 20, 21, 22, 23, 24, 25 and 26.

The input on line 8 is the hard-limited, envelope derived signal generated by infinite clipper 4. The high speed clock generated by counter 19 is received on line 12. The hard-limited radio RF signal from infinite clipper 4 is received on line 7. The other input comprises binary data on line 10 to register 9 and a clock input on line 11 to gate the data into the register 9.

The 7-bit register is implemented by bipolar flip flops identified by numbers 28, 29, 30, 31, 32, 33, and 34. NOR gate 27 provides an inverter for the input data. The binary number in the register controls the time at which the data samples are taken within a particular cycle of the logic clock which nearly coincides with a cycle of the signals appearing and on lines 7 and 8.

Outputs 21 and 22 provide data samples taken from the hard-limited RF signal and represent the edge and peak samples respectively of cycles within the signal on line 7. Output 20 provides a data sample taken at the approximate peak of the envelope derived signal on input line 7. Since the signals on lines 7 and 8 have been clipped, the peaks would occur at the approximate midpoints of the binary pulses shown in FIG. 3.

Outputs 23 and 26 represent the four-phase clock signals generated by the bipolar divider 5 in synchronism with the generation of the data samples. The four-phase clocks are relatively low speed clocks having a 90° phase relationship. The clocks are used by the MOS circuits shown in FIG. 1 for processing the data in the manner indicated.

It should be understood that although four-phase clocks are shown, the invention is not limited to the generation of four-phase clocks or any multiphase clocks. A particular embodiment may require different clocks. The only requirement is that the data samples be synchronized with the clock signals so that the system can process the data effectively.

The circuits for generating data samples at the peaks of the hard-limited RF signal are implemented by flip flops 35 through 43. In addition, flip flops 44 through 46 generate the edge data samples for the hard-limited RF signal. The data samples for the hard-limited envelope derived signal are generated by flip flops 47, 48, 49 and 50. It is pointed out that a smaller number of flip flops is used to generate the data samples for the hard-limited envelope derived signal than are used to generate the data samples for the hard-limited RF signal. The smaller number of flip flops is used since the data samples taken from the signal on line 8 need not be taken as accurately in time as the data samples taken from the hard-limited RF signal.

NAND gates 51, 52, 53 and 54 are used for phase reversal of the various input signals shown. In other words, if one input to flip flop 50 is logic 1, in order to generate a signal representing a logic 0, the signal must undergo a phase reversal.

Flip flops 55, 56, 57, 58, 59 and 60 with flip flop 61 form a binary, free running counter to divide the relatively high speed clock at input 12. The data samples are buffered in flip flops 42, 40, 38, 36, 35, 45, 44, 50, 48 and 47 so that the data samples on output lines 20 through 22 are generated in synchronism with the four-phase clock signals $\phi_{4+1}$, $\phi_{2+3}$, $\phi_{3+4}$, and $\phi_{1+2}$.

AND-OR-INVERT (AOI) circuits 62, 63, 64, 65, 66, 67 and 68 control whether a pulse is sampled during a rise or fall of a clock pulse. The output from an AND-OR-INVERT circuit may be represented as $\overline{AB+CD}$. Stated functionally, if the least significant bit (flip flop 34) of register 9 had been a logic 1, information would have been gated into flip flop 43 by the falling edge of the clock signal on line 12.

A general description of the operation of the data divider 5 is given in connection with FIG. 2. A 7-bit number is calculated by the counter compare circuit 19 and entered serially into the 7-bit register 9. The number may be any number from 0–127. The range represents a one half cycle interval of a binary pulse, such as pulse 85 in FIG. 3. Assuming each half cycle of the binary pulse of FIG. 3 to be 5 microseconds, each of the 128 intervals is spaced 39 nanoseconds apart.

The hard-limited signal on line 7 is gated into flip flop 43 by the input clock on line 12 or its complement, as determined by the least significant bit of the 7-bit number in flip flop 34 of register 9. AOI circuit 68 selects the gating phase of the clock. If the least significant bit is a 1, the falling edge of the clock is used whereas if the least significant bit is a 0, the complement of the clock (rising edge) is used to gate information into flip flop 43.

The output from flip flop 43, which samples the signal on line 7, is gated into flip flop 42 by the clock singal from NAND gate 53 for being temporarily stored or held until gated to flip flop 41. Therefore, the information being gated into flip flop 42 is resynchronized with the clock signal.

Information is gated from holding flip flop 42 into flip flop 41, using the rise or fall phase of the clock signal divided by flip flop 60 as a function of the logic bit in flip flop 33. The bit of information gated into flip flop 40 is resynchronized with the divided clock signal from flip flop 60.

Flip flop 39 is gated by the output of AOI circuit 66 to sample data from flip flop 40 in synchronism with the divided clock in flip flop 59 or its complement according to the data in register flip flop 32. The sampled data in flip flop 39 is resynchronized to the clock in flip flop 59 by being gated into the holding flip flop 38 by the complement output of flip flop 59.

The portion of the FIG. 2 system described above performs three binary divisions and resynchronizations of the input data on line 7 according to the least significant three bits in the register 9.

Flip flops 58, 57 and 56 divide the clock at the output of flip flop 59 by a factor of eight. AOI circuits 65, 64 and 63 in conjunction with NAND circuit 70 compare the number in register flip flops 31, 30 and 29 with the counter flip flops 58, 57 and 56. When the corresponding flip flops all agree, the NAND gate 70 output is false; otherwise, it is true. NOR gate 69 combines the agreement information with the complemented clock output of 59 in order to gate a clock pulse to sampling flip flop 37 during the interval when the agreement is made. Thus, data is sampled from flip flop 38 into flip flop 37 when the counter flip flops 58, 57 and 56 agree with register flip flops 31, 30 and 29.

The clock counter formed by flip flops 58, 57 and 56 indicate the zero state when all are logically 0. This 0 state is determined by NAND gate 71 for resynchronizing the data in flip flop 37 as it is gated into flip flop 36.

NAND gate 71 also uses the output of AOI circuit 62 so that an additional binary division of the data is performed at the same time that the data is resynchronized. AOI circuit 62 selects the clock output of flip flop 55 or its complement according to the data in register flip flop 28. NAND gate 71 is used in conjunction with the complement clock output from flip flop 59 by NOR gate 72 to gate data from flip flop 37 into flip flop 36. Flip flop 35 resynchronizes the sampled data with the output clock of the data divider. Flip flops 46 and 45 generate a sample for output 21 which was taken 2.5 microseconds prior to the sample for output 22. Flip flops 45 and 44 resynchronize the data in the same manner as flip flops 36 and 35.

Flip flops 47 through 50 are used in a manner similar to flip flops 35 through 38, the difference being that a different input signal is being sampled. Circuitry like flip flops 39 through 43 could have been added to improve the accuracy of the sampling times for output 20. The increased accuracy was not required for the embodiment shown.

Flip flops 35, 44 and 47 are all gated by clock signal $\phi_{4+1}$ so that the data is synchronized with all the clock signals. Flip flop 61 receives inputs from flip flop 55 so that the outputs 23-26 are displaced by 90°.

The clock signal passes through NAND gates 53 and 54 and is divided by flip flop 60. If the clock signal had been 12.8 MHZ, as indicated above, the clock signal from flip flop 60 would have a frequency of 6.4 MHZ. The logic 1 output gates gate flip flop 59, which further divides the clock signal by a factor of 2. Flip flop 58 is similarly gated by the logic 1 output from flip flop 59 to further divide the clock by a factor of 2. Assuming a 12.8 MHZ clock, the output from flip flop 58 has a frequency of 1.6 MHZ. Flip flops 57, 56, and 55 further divide the clock signal so that the multiphase clock signals from flip flops 55 and 61 have a frequency of 200 KHZ.

Figure 4A:
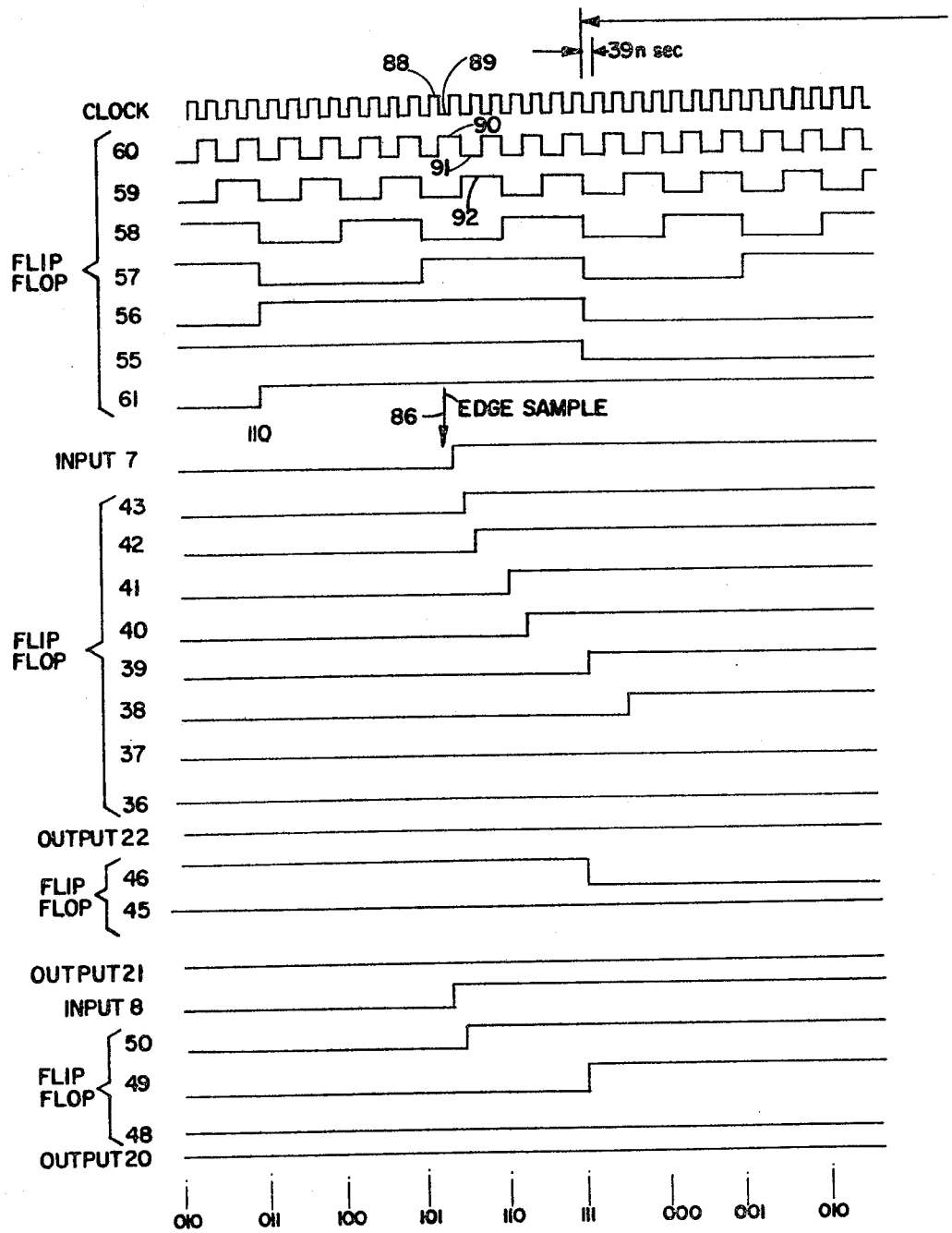
FIGS. 4a, 4b and 4c are illustrations of signals generated within the data sampling circuit and at the outputs of the data divider for one computed sampling time.
Figure 4B:
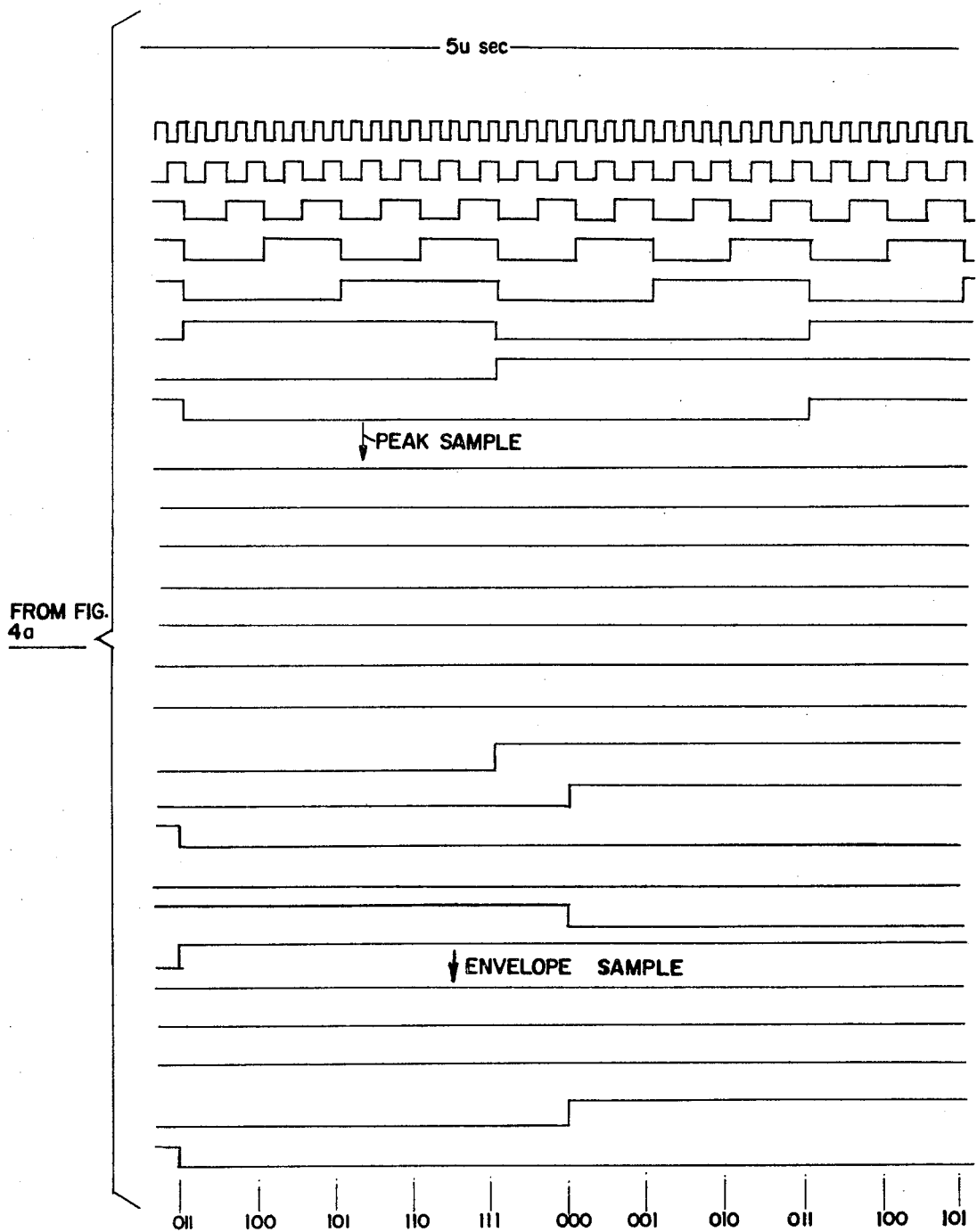

FIGS. 4a and 4b are illustrations of the signals at the inputs and outputs of the bipolar flip flops and gates comprising the FIG. 2 circuit for a specific binary number in register 9. The number, 0111111, corresponds to the interval 63 of a pulse on line 7 displaced by 2.5 microseconds. The most significant bit "0" is stored by flip flop 28.

The clock signal on input line 12 is divided from a frequency of, for example, 12.8 MKZ to a frequency of 200 KHZ at the outputs of flip flops 55 and 61. For the example given, each clock pulse lasts 39 nanoseconds.

One pulse of the hard-limited RF signal on line 7 may be shown as comprising from 0–127 intervals. The 128 intervals occur over a 5 nanosecond period. The position of the edge sample, point 86, corresponds to the number in register 9. As indicated by the figure, the edge sample generated at output 21 should be false. Since the peak sample occurs 2.5 microseconds later, it should be true at the output 22.

Flip flop 34 contains a logic "1" bit. As a result, the sample is gated into flip flop 43 at the trailing edge of a true clock pulse identified by the numeral 88. The clock pulse is passed through AOI circuit 68 so that its true or false phase is selected as a function of the bit in flip flip 34. Flip flop 42 which holds, or stores, the data sample initially taken by flip flop 43 is gated by the next clock pulse 89 which is inverted through gate 53.

The data sample is taken by flip flop 41 from the sample being held by flip flop 42. Pulse 90 from flip flop 60 gates flip flop 41 since the bit in flip flop 33 is true. In effect, the output from flip flop 60 becomes the clock signal for the bit position represented by flip flop 33. Flip flop 40 is gated by inverted pulse 91 since it is taken from the logic "0" output of flip flop 60.

Flip flop 39 samples the data being stored by flip flop 40 during the next true clock interval 92 from flip flop 39. As indicated above, the phase of the clock interval is determined by the bit in flip flop 32. The true or false interval is selected by inverter 66.

Although the design of the circuit 5 changes at the most significant bit positions, the data selection and holding process is substantially the same for all the bit positions. The samples taken initially by flip flops 43 and 46 are continuously shifted as the information is gated through the flip flops to the outputs 21 and 22. As indicated by the output signal from flip flop 35, point 93, the peak data sample, is true. Similarly, as indicated by the output 21 from flip flop 44, the edge sample is false for the specific number contained in register 9.

Figure 5A:
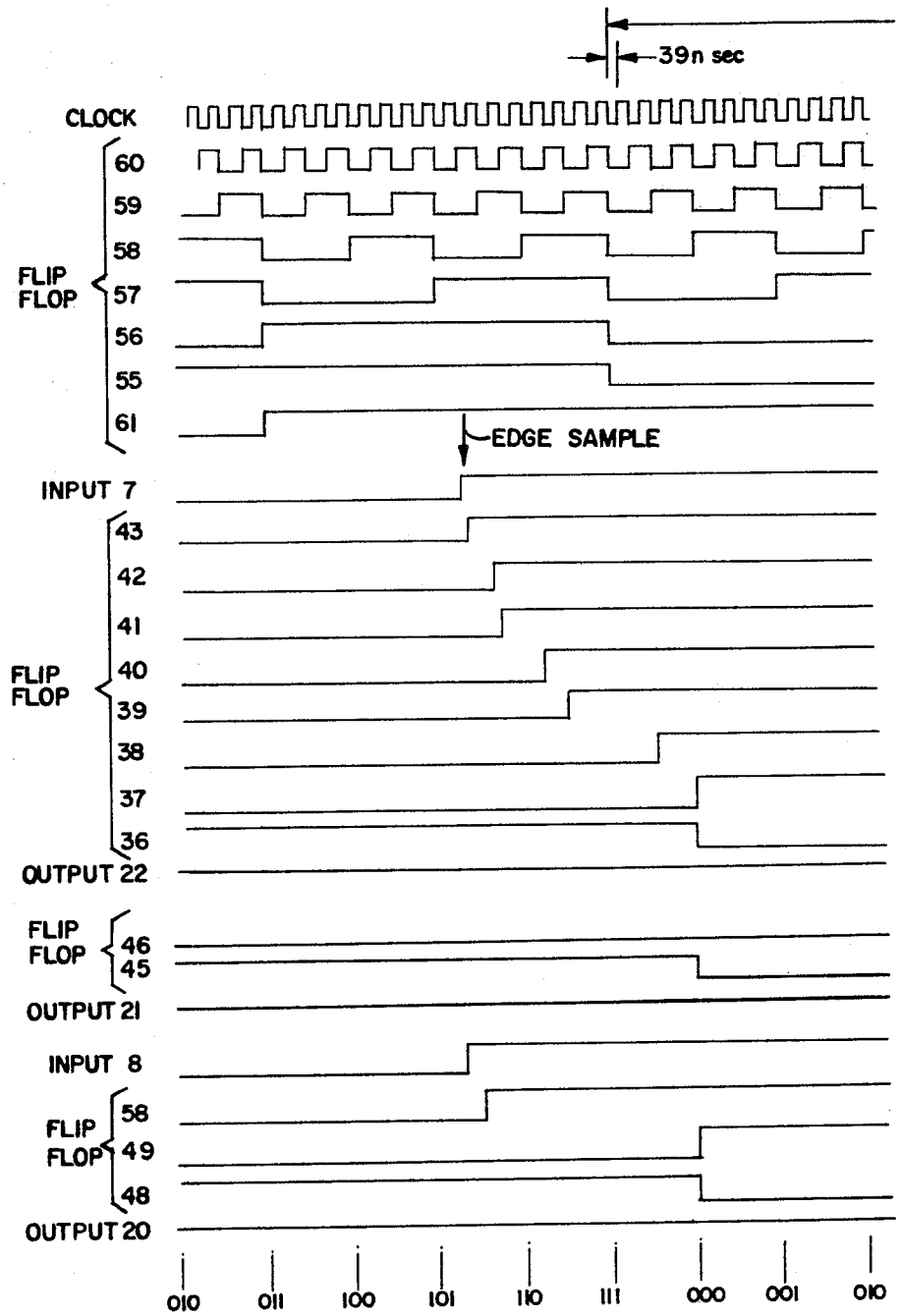
FIGS. 5a, 5b and 5c are illustrations of signals generated within the data sampling circuit and at the outputs of the data divider for a different data sampling time.
Figure 5B:
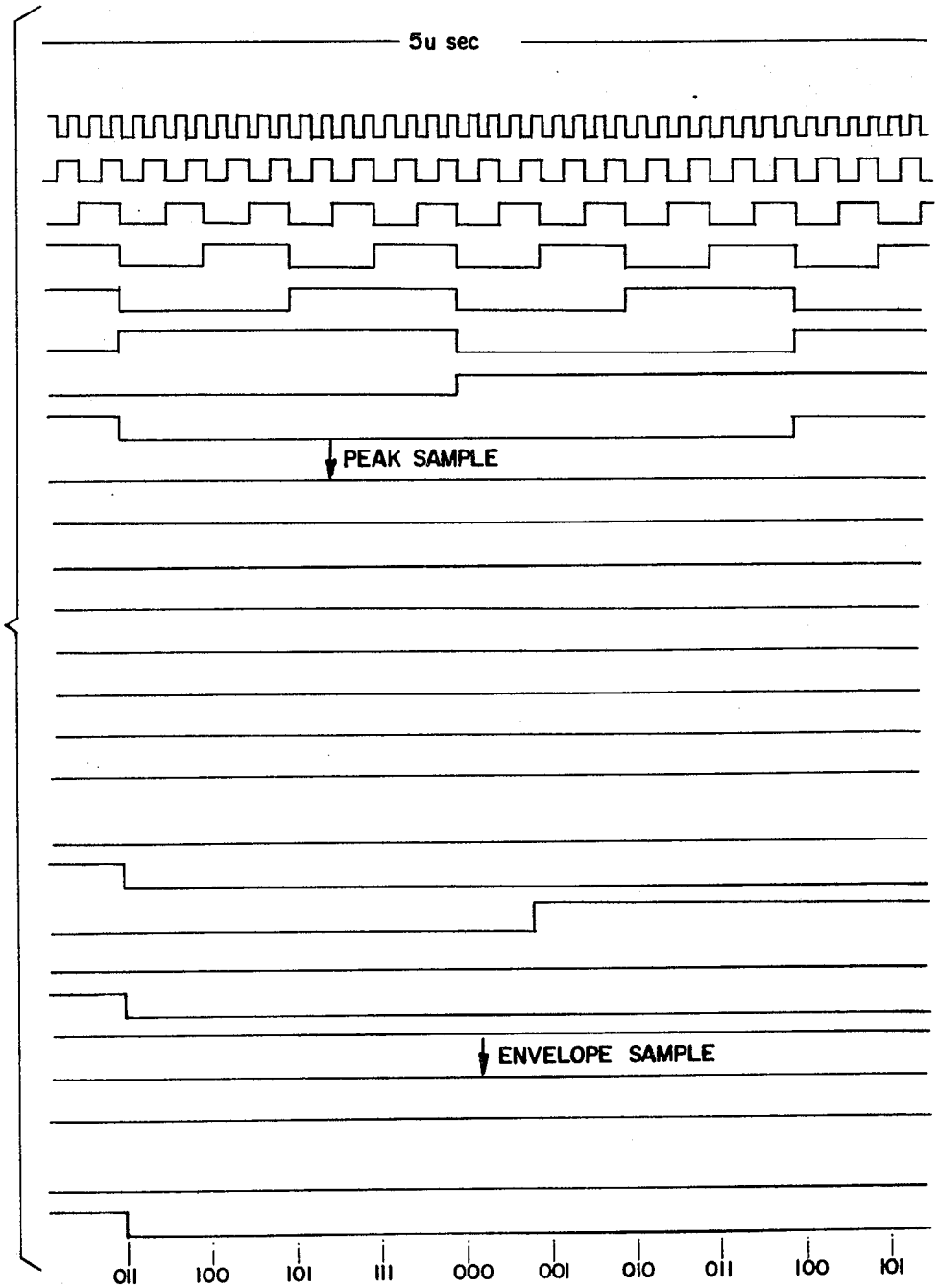

During the next interval where the register number is increased by one, data sample selection times are shifted to the right. As a result, both outputs should be true. FIGS. 5a and 5b illustrate the specific example where the register contains the number 1000000. For that case, it can be seen that the data samples numbered 95 and 96 are true.

For the FIGS. 4a and 4b examples, the output 97 on line 20 from flip flop 47 is seen to be true. Similarly, the output 98 on line 20 from flip flop 47 for the specific example represented by FIG. 5 is also true.

Figure 4C:
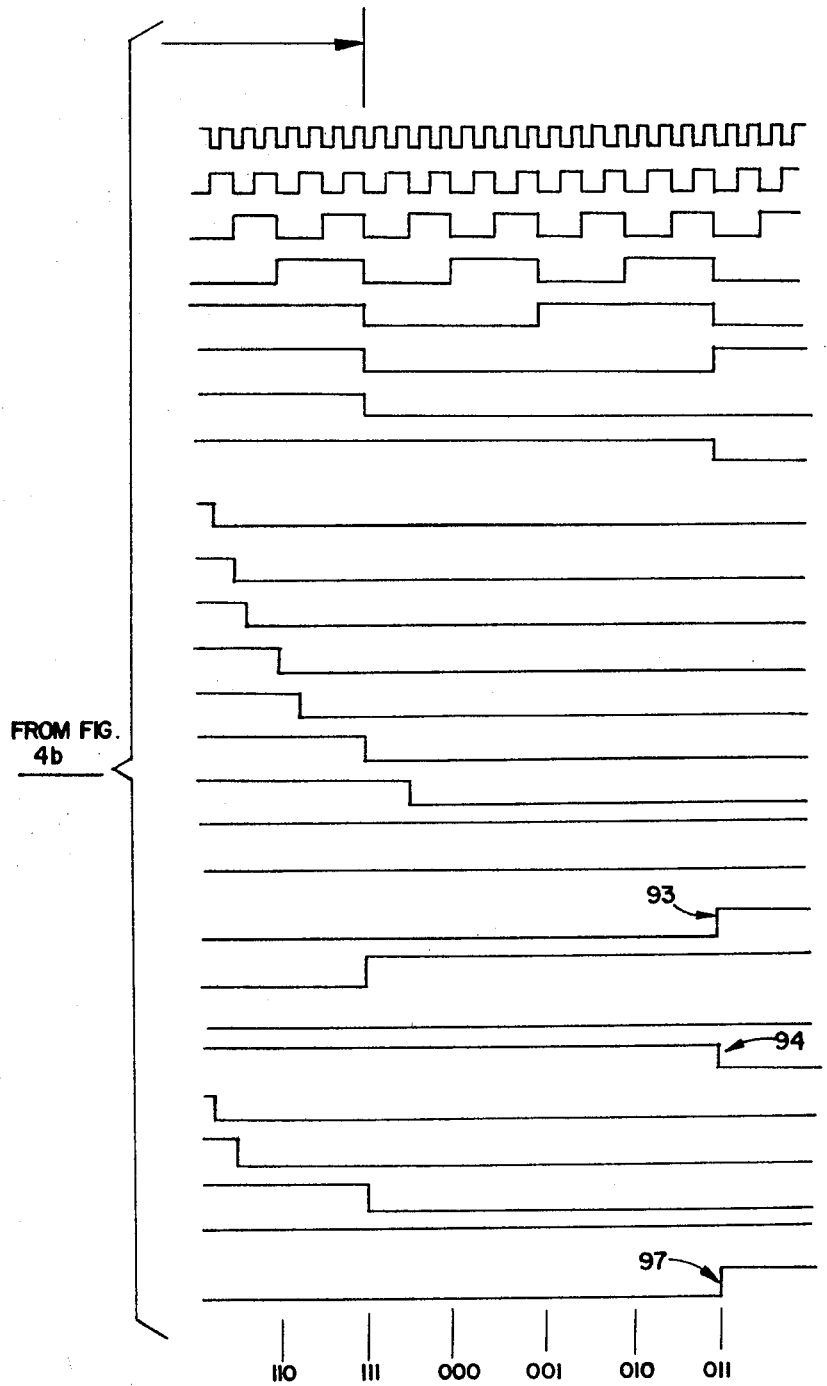
Figure 5C:
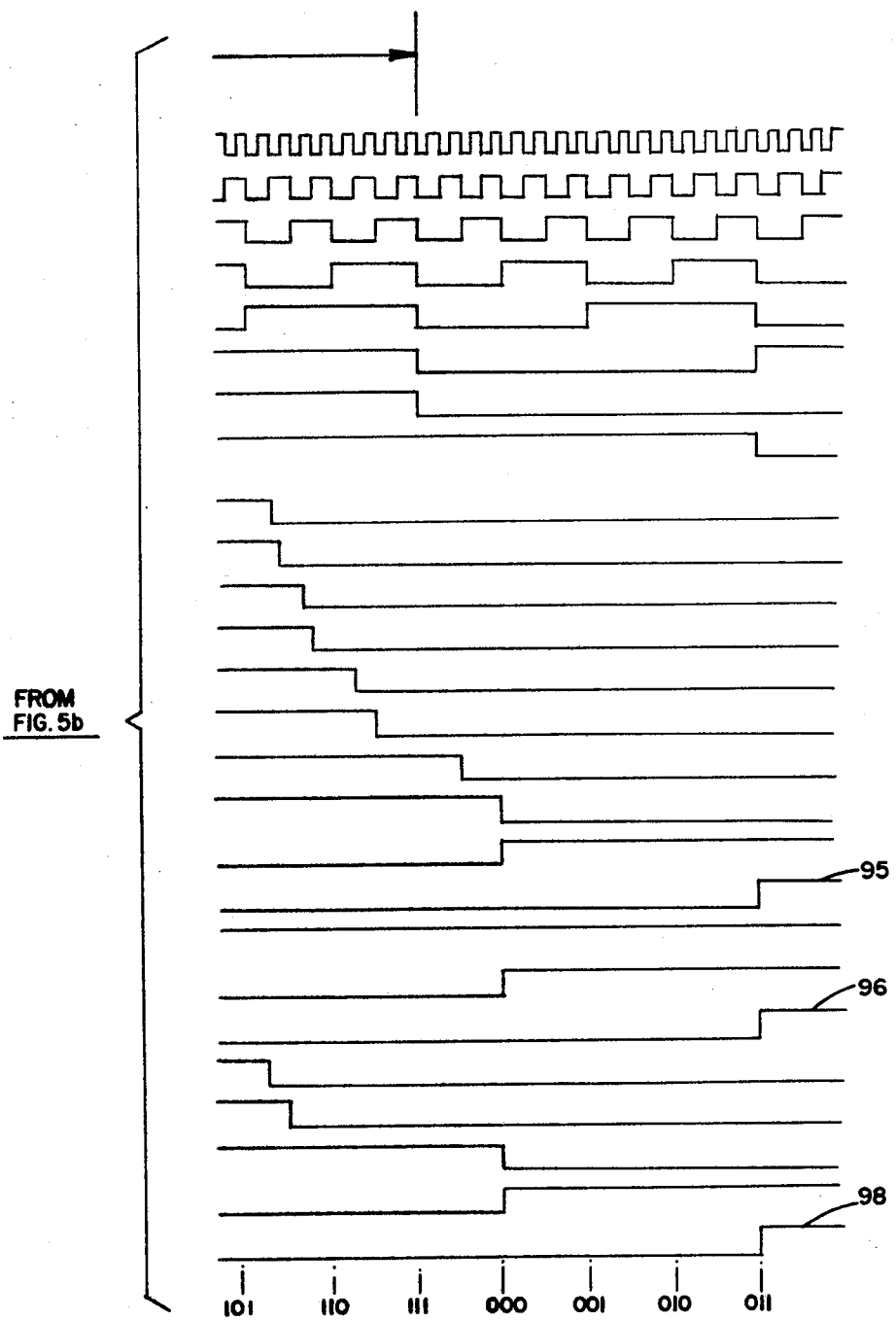

Although additional examples and descriptive materials could be added, it is believed that the specific examples illustrated by FIGS. 4 and 5 should be adequate to illustrate how data is initially sampled at the inputs to the FIG. 2 circuit continuously shifted so that the data samples at the outputs have a substantially lower frequency than the data signals at the inputs. It should be understood that the number of sampling and holding flip flops can be increased or decreased to generate data samples having any particular frequency. Nine bipolar flip flops are used to generate the peak data sample in FIG. 2. In another embodiment, 14 flip flops could be used. The reduced number of flip flops was a result of the design of the circuit at the most significant bit positions. It would be possible to design the circuit using two flip flops at each bit position, as is illustrated by the circuit design for the least significant bit positions.

Similarly, although four flip flops are used in the generating of the peak sample for the signal on line 7, the same number of flip flops as were used to generate the peak sample on line 22 could have been used. The reduced number was used for convenience and since less accuracy was required for the embodiment described and shown.

I claim:

1. A circuit for generating relatively slower speed data samples from higher speed data signals, said circuit comprising, register means for storing a number indicating where the data samples are to be taken within a cycle of said high speed data signals, first means responsive to said register means for sampling said high speed data signals, said first means responsive includes means for generating two data samples within a cycle of high speed data signals, with one of said samples being used for phase comparison purposes.

2. A circuit for generating relatively slower speed data samples from higher speed data signals, said circuit comprising, register means for storing a number indicating where the data samples are to be taken within a cycle of said high speed data signals, first means responsive to said register means for sampling said high speed data signals, said register means includes means for changing said number after each data sample has been taken until said data samples are taken at a predetermined time within each cycle of said high speed signals.

3. A circuit for generating relatively slower speed data samples from higher speed data signals, said circuit comprising, register means for storing a number indicating where the data samples are to be taken within a cycle of said high speed data signals, first means responsive to said register means for sampling said high speed data signals, second means responsive to each bit of said register means and to a clock signal for controlling the selection of the data samples by said first means responsive, and said first means responsive selecting said data samples under the control of a discrete phase of said clock signal as a function of the bit information at each bit position of said register means.

4. The combination recited in claim 3 wherein said first means responsive includes first bipolar devices for sampling said data samples in response to the output from said second means responsive, and second bipolar devices receiving outputs from the first bipolar devices, said second bipolar devices being gated by clock signals, means for dividing an input clock signal and for synchronizing the sampling of said data with said divided clock signal, said divided clock gating said second bipolar devices.

* * * * *